United States Patent
Thanayankizil et al.

(10) Patent No.: US 11,382,133 B2
(45) Date of Patent: Jul. 5, 2022

(54) METHOD AND APPARATUS FOR INTELLIGENT WIRELESS PROTOCOL OPTIMIZATION

(71) Applicant: GM GLOBAL TECHNOLOGY OPERATIONS LLC, Detroit, MI (US)

(72) Inventors: Lakshmi V. Thanayankizil, Rochester Hills, MI (US); Steven Hartley, Pointe-Claire (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 17/092,886

(22) Filed: Nov. 9, 2020

(65) Prior Publication Data

US 2022/0150966 A1 May 12, 2022

(51) Int. Cl.
| | |
|---|---|
| H04W 4/00 | (2018.01) |
| H04B 7/00 | (2006.01) |
| H04W 74/08 | (2009.01) |
| H04W 4/40 | (2018.01) |
| H04W 24/02 | (2009.01) |

(52) U.S. Cl.
CPC ......... *H04W 74/0816* (2013.01); *H04W 4/40* (2018.02); *H04W 24/02* (2013.01)

(58) Field of Classification Search
CPC .... H04W 74/0816; H04W 4/40; H04W 24/02
USPC ...................................................... 370/329
See application file for complete search history.

(56) References Cited

U.S. PATENT DOCUMENTS

| | | | | |
|---|---|---|---|---|
| 2002/0150095 A1* | 10/2002 | Sherman | ........... | H04W 74/0808 370/389 |
| 2002/0152324 A1* | 10/2002 | Sherman | ........... | H04W 74/0808 709/245 |
| 2002/0181425 A1* | 12/2002 | Sherman | ........... | H04W 74/0808 709/245 |
| 2004/0013128 A1* | 1/2004 | Moreton | ............... | H04W 74/02 370/447 |
| 2004/0196871 A1* | 10/2004 | Terry | .................... | H04W 28/06 370/477 |
| 2005/0025104 A1* | 2/2005 | Fischer | ................. | H04W 16/14 370/464 |
| 2005/0075130 A1* | 4/2005 | Godfrey | ................ | H04W 16/14 455/552.1 |
| 2006/0056367 A1* | 3/2006 | Marinier | ............... | H04W 48/08 370/338 |
| 2006/0171304 A1* | 8/2006 | Hill | ........................ | H04W 88/08 370/389 |

(Continued)

*Primary Examiner* — Mark G. Pannell
(74) *Attorney, Agent, or Firm* — Lorenz & Kopf LLP (57) ABSTRACT

The present application relates to a method and apparatus for intelligent wireless protocol optimization including receiving, by a processor, a request from a first media access controller to transmit a first data signal, transmitting, by the processor, a ready to send packet to the second media access controller in response to the second media access controller being currently transmitting a second data signal, transmitting the first data signal by the first media access controller, transmitting a clear to send packet by the second media access controller to the second media access controller in response to the transmitting of the first data signal by the first media access controller, and continuing transmission of the second data signal in response to a completion of the transmission of the first data signal by the first media controller.

20 Claims, 4 Drawing Sheets

(56) References Cited

U.S. PATENT DOCUMENTS

| | | | | |
|---|---|---|---|---|
| 2008/0268778 | A1* | 10/2008 | De La Garrigue | H01Q 9/285 |
| | | | | 455/41.2 |
| 2012/0129456 | A1* | 5/2012 | Xhafa | H04W 16/14 |
| | | | | 455/552.1 |
| 2012/0163312 | A1* | 6/2012 | Xhafa | H04W 28/06 |
| | | | | 370/329 |
| 2012/0281533 | A1* | 11/2012 | Xhafa | H04W 24/08 |
| | | | | 370/252 |
| 2014/0064101 | A1* | 3/2014 | Hart | H04W 74/0808 |
| | | | | 370/241 |
| 2015/0024687 | A1* | 1/2015 | Rawat | H04W 4/80 |
| | | | | 455/41.2 |
| 2017/0134989 | A1* | 5/2017 | Hirsch | H04W 74/08 |

\* cited by examiner

METHOD AND APPARATUS FOR INTELLIGENT WIRELESS PROTOCOL OPTIMIZATION

BACKGROUND

The present disclosure relates generally to wireless networking systems. More specifically, aspects of this disclosure relate to systems, methods and devices to implement a multiband in-vehicle wireless networking system including an algorithm to optimize wireless connections on common wireless communications hardware.

Mobile devices that utilize wireless communications are becoming more and more ubiquitous. For example, powerful smartphones are used for communication, entertainment, and information such as maps, navigation, location detection and the like. As personal electronic devices increase capabilities, tasks that were traditionally performed by dedicated devices, such as radio reception in an automobile, are being handed off to the personal electronic devices. However, these personal electronic devices must still be connected to the user interfaces, such as display screens and speakers, of the host vehicle. Initially these connections were made with dedicated cables, such as audio cables to audio inputs, then universal serial bus (USB) cables, and more recently, wireless communications links, such as Wi-Fi or Bluetooth.

A problem arises in the case of vehicular wireless communications in that some functions may try to simultaneously use the same communications channels and may not have protocols available to minimize interruptions. Some vehicle wireless communications systems may not support wireless phone projection, such as is required for Apple CarPlay and Android Auto as well as Wi-Fi hotspot connections simultaneously. These applications may interfere with each other when executing on same hardware as they may feature very different operation modes. For example, Wireless Phone Projection may require a Wi-Fi chipset to have dedicated operation in a frequency channel, whereas connections to hotspots require the Wi-Fi chipset to hop through multiple channels periodically. Timing problem may occur because Wi-Fi chipsets today are partitioned based of frequency, as that is needed from a RF perspective, and not based of feature requirements. It would be desirable to overcome these problems to provide intelligent protocol optimizations to ensure multiple features may coexist on a single Wi-Fi hardware without degrading performance.

The above information disclosed in this background section is only for enhancement of understanding of the background of the invention and therefore it may contain information that does not form the prior art that is already known in this country to a person of ordinary skill in the art.

SUMMARY

Disclosed herein are various wireless communications protocols and related control logic for provisioning vehicle wireless communications systems, methods for making and methods for operating such systems, and motor vehicles equipped with onboard wireless communications and control systems. By way of example, and not limitation, there is presented an automobile with onboard vehicle wireless communications systems and corresponding control systems.

In accordance with an aspect of the present disclosure, a method including receiving, by a processor, a request from a first media access controller to transmit a first data signal, transmitting, by the processor, a ready to send packet to the second media access controller in response to the second media access controller being currently transmitting a second data signal, transmitting a clear to send packet by the second media access controller to the second media access controller in response to the transmitting of the first data signal by the first media access controller, transmitting the first data signal by the first media access controller, and continuing transmission of the second data signal in response to a completion of the transmission of the first data signal by the first media controller.

In accordance with another aspect of the present disclosure wherein the first media access controller and the second media access controller form a portion of a dual media access controller chip.

In accordance with another aspect of the present disclosure wherein the first data signal and the second data signal are transmitted via a wireless transmission channel.

In accordance with another aspect of the present disclosure wherein the first data signal and the second data signal are transmitted via a five gigahertz wireless transmission channel.

In accordance with another aspect of the present disclosure wherein the first data signal is a wireless phone projection signal.

In accordance with another aspect of the present disclosure wherein the second data signal is a wireless hotspot connection signal.

In accordance with another aspect of the present disclosure further including receiving, by the processor, a request from the second first media access controller to transmit a third data signal and transmitting, detecting the transmission of a fourth data signal by the first media access controller and transmitting the third data signal in response to a completion of the transmission of the fourth data signal by the first media controller.

In accordance with another aspect of the present disclosure wherein a feature associated with the first data signal has a higher priority than a feature associated with the second data signal.

In accordance with another aspect of the present disclosure wherein the first data signal is a video stream from a wireless camera.

In accordance with another aspect of the present disclosure, an apparatus including a processor for receiving request from a first media access controller to transmit a first data signal and for coupling a read to send packet to a second media access controller in response to the request from the first media access controller and the second media access controller being currently transmitting a second data signal, a transmitter configured for transmitting the first data signal and for continuing transmission of the second data signal in response to a completion of the transmission of the first data signal, and the second media access controller being configured for transmitting a clear to send packet to the second media access controller in response to the transmitting of the first data signal by the first transmitter.

In accordance with another aspect of the present disclosure wherein the first media access controller and the second media access controller form a portion of a dual media access controller chip.

In accordance with another aspect of the present disclosure wherein the transmitter is a radio frequency transmitter and wherein the first data signal and the second data signal are transmitted via a wireless transmission channel.

In accordance with another aspect of the present disclosure wherein the first data signal and the second data signal are transmitted via a five gigahertz wireless transmission channel.

In accordance with another aspect of the present disclosure wherein the first data signal is a wireless phone projection signal.

In accordance with another aspect of the present disclosure wherein the first data signal is a video stream from a wireless camera.

In accordance with another aspect of the present disclosure wherein the second data signal is a wireless hotspot connection signal.

In accordance with another aspect of the present disclosure wherein the processor is further configured for receiving a request from the second first media access controller to transmit a third data signal and transmitting, detecting the transmission of a fourth data signal by the first media access controller and transmitting the third data signal in response to a completion of the transmission of the fourth data signal by the first media controller.

In accordance with another aspect of the present disclosure wherein a feature associated with the first data signal has a higher priority than a feature associated with the second data signal In accordance with another aspect of the present disclosure, a dual media access controller including a transmitter for transmitting a first data signal and a second data signal, a first media access controller for generating a first request to transmit a first data signal, and a second media access controller for receiving a request to send packet in response to the transmitter transmitting the second data signal and the first request to transmit the first data signal, the second media access controller being configured for transmitting a clear to send packet to the second media access controller in response to the transmitting of the first data signal by the transmitter.

In accordance with another aspect of the present disclosure wherein the transmitter is a radio frequency transmitter and the first data signal and the second data signal are wireless data signals.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Typical Wi-Fi Bluetooth communications processors have two radio interfaces; one dedicated to 2.4 GHz and the other dedicated to 5 GHz. In an exemplary automotive application, the 2.4 GHz interface may be used for features like Wi-Fi Hotspot and connections to external hotspots which do not require dedicated operation in one frequency. A 5 GHz interface may host features like wireless phone projection which requires dedicated operation at a single frequency and connection to external hotspots which requires frequency hopping. As the need for wireless device connection in automotive applications increases and the bandwidth requirements of these wireless devices increases, data download requirements are likewise increasing. It is desirable to provide a mechanism to ensure a maximum number of applications with required bandwidth may operate without performance degradation.

In the following embodiments, control of transmission of data and transmission of data are used as examples. Reception of data and control of reception of data may also be performed by these exemplary systems and methods in a similar algorithm according to the present disclosure. Transmission of data is used for clarity and should not be interpreted as to exclude reception of data in these embodiments and/or exemplary systems.

Figure 1:
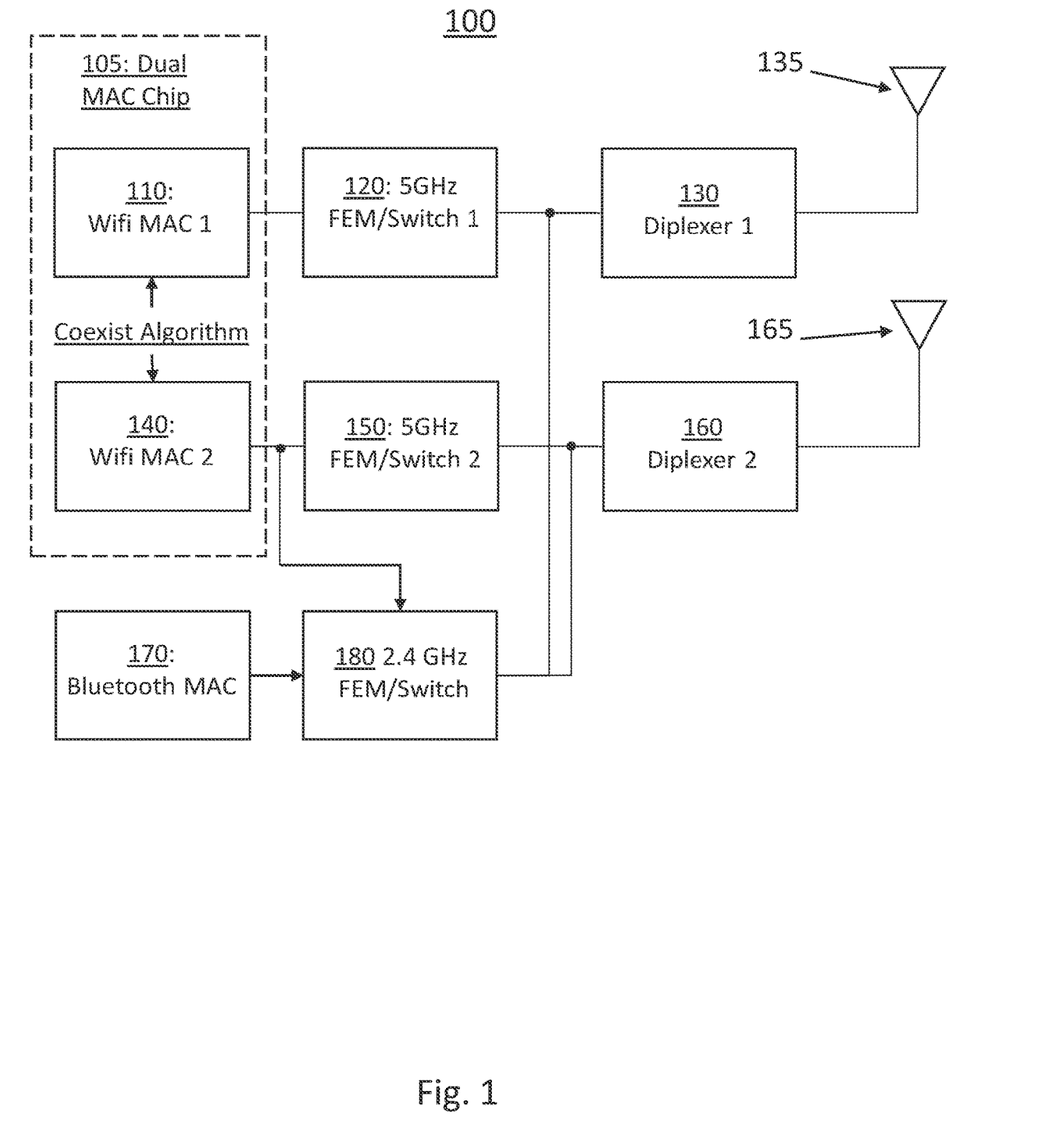
FIG. 1 shows a block diagram illustrating a system for intelligent wireless protocol optimization according to an exemplary embodiment.

Turning now to FIG. 1, a wireless communications system 100 for intelligent wireless protocol optimization according to an exemplary embodiment is shown. The exemplary wireless communications system 100 may include a first Wi-Fi media access controller (MAC) 110, a first 5 GHz front end module (FEM)/switch 120, a first diplexer 130, a first antenna 134, a second Wi-Fi MAC 140, a second 5 GHz FEM/switch 150, a second diplexer 160, a second antenna 165, a Bluetooth MAC 170 and a 2.4 GHz FEM/Switch 180. In one exemplary embodiment, the first MAC 110 and the second MAC 140 may form a portion of a dual MAC chip 105.

The exemplary system 100 is configured to offer Multiple Wi-Fi features on same hardware without performance degradation, such as Wireless Phone Projection (WPP) concurrently with connections to external hotspots such as provided by internet service providers and wireless cameras located on the host vehicle. Currently, difficulties arise when attempting to reliably offer these multiple Wi-Fi features concurrently as Wi-Fi chipsets are typically partitioned based on frequency as is needed from a RF perspective, and not based on feature requirements. The exemplary system 100 is configured to perform a method to support Real Simultaneous Dual Band (RSDB) and Virtual Simultaneous Dual Band (VSDB) at the same time in a single dual MAC Wi-Fi chipset through feature prioritization in lieu of RF isolation. In one exemplary application, the system 100 may dedicate one core, such as the first Wi-Fi MAC 110, for high priority wireless projection and hotspot (at 5 GHz), and have the other core, such as the second Wi-Fi MAC 140, time slicing between station (client) mode in both 5 GHz or 2.4 GHz in order to avoid cross talk and other physical limitations.

The current system 100 employs intelligent switching algorithms to ensure feature-based partitioning that can overcome RF limitations. The current system 100 is operative for identifying and partitioning features based on feature requirements. The system 100 ensuring that features that require dedicated operation are allocated to one portion of the hardware, and the features that do not require dedicated operation are allocated to another portion. The methodology employed by the exemplary system 100 supports both Wireless Phone Projection and Connections to External Hotspot concurrently through the use of a Wi-Fi coexistence algorithm between the first MAC 110 and the second MAC 140 on the dual MAC chip 105.

The first Wi-Fi MAC 110 is configured to control hardware responsible for interaction with the wireless transmission medium. In this exemplary embodiment, the first MAC 110 is configured to enable features that require dedicated operation, such as Wireless Phone Projection. When the first MAC 110 generates a transmit request, the second MAC 140 is configured to send CTS to itself until the first MAC 110 is finished transmitting. If the second MAC 140 is transmitting when the first MAC 110 generates the transmit request, the coexistence algorithm is configured to transmit an RTS to the second MAC 140 after which the second MAC 140 sends CTS to itself until the first MAC 110 is finished transmitting. The second MAC 140 may then transmit an RTS to continue transmitting. In one example, the second MAC 140 may send CTS to itself only when the first MAC 110 and the second mac 140 want to transmit on the same band. If the second MAC 140 requests to transmit on 2.4 GHz then may do so without requiring waiting for the first MAC 110 to finish.

The first 5 GHz front end module (FEM)/switch 120 is configured to receive data from the first MAC 110 and to convert this data to a format suitable for coupling to the first diplexer 130 and the first antenna 135. The second 5 GHz FEM/switch 150 is configured to receive data from the second Wi-Fi MAC 140 and to format the data into a format suitable for coupling to the second diplexer 160 and the second antenna 165. The Bluetooth MAC 170 is configured to control access to a 2.4 GHz transmission channel for the transmission of Bluetooth data and the like. The 2.4 GHz FEM/Switch 180 is configured to couple either data from the second MAC 140 or the Bluetooth MAC 170 for transmission via a 2.4 GHz transmission channel and for coupling to one of the first diplexer 130 and the second diplexer 160.

In an alternate embodiment, when the first MAC 110 generates a transmit request, the second MAC 140 is may be configured to switch from the 5 GHz channel to the 2.4 GHz channel until the first MAC 110 is finished controlling transmission. If the second MAC 140 is controlling transmission on the 5 GHz channel when the first MAC 110 generates the transmit request, the coexistence algorithm is configured to transmit an RTS to the second MAC 140 after which the second MAC 140 switches to the 2.4 GHz transmission channel until the first MAC 110 is finished controlling transmission. The second MAC 140 may then transmit an RTS to continue controlling transmission on the 5 GHz transmission channel after the first MAC 110 is finished transmitting.

Figure 2:
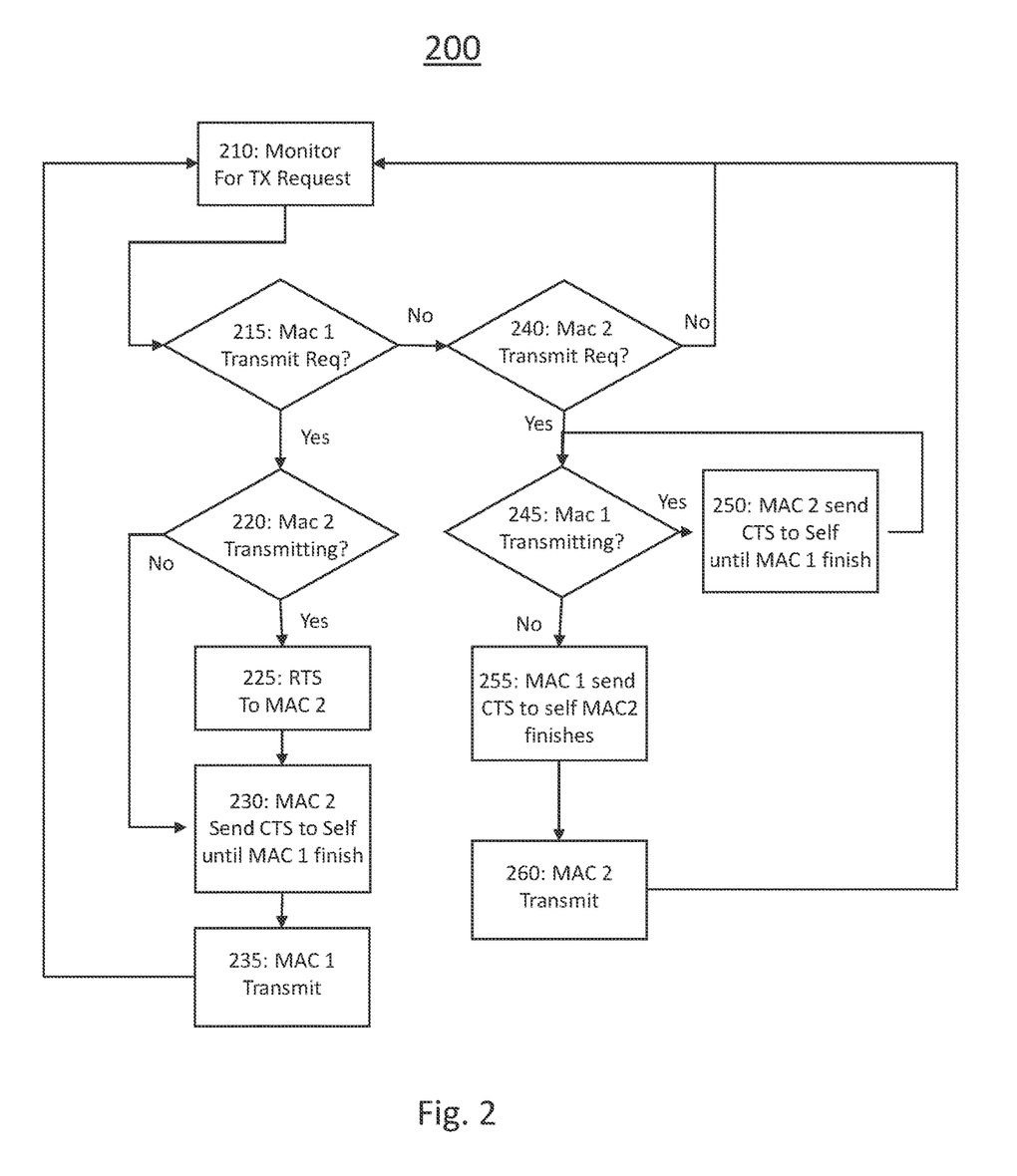
FIG. 2 shows a flow chart illustrating a method for intelligent wireless protocol optimization according to an exemplary embodiment.

Turning now to FIG. 2, a flow chart illustrating a method 200 for intelligent wireless protocol optimization according to an exemplary embodiment is shown. The exemplary method is first initiated during vehicle startup or wireless network application startup. The method then monitors 210 for MAC requests. A MAC is an application which controls the hardware interaction with the wireless transmission medium. The MAC may perform flow control or multiplexing for the wireless transmission medium. A MAC request is a request for use of the wireless transmission medium from a data transmitting device.

The method is next configured to determine 215 if a request has been received for a first MAC. In this exemplary embodiment, the first MAC, is configured to enable 5 GHz wireless projection for a wireless connection between a personal electronic device, such as a smartphone, and a vehicle infotainment system. If the request has been received for the first MAC, the method then determines 220 if the second MAC is controlling transmission on the 5 GHz transmission channel. If the second MAC is controlling transmission on the 5 GHz transmission channel, the method then transmits 225 a request to send (RTS) to the second MAC. After the RTS is sent to the second MAC, the second MAC then sends 230 CTS to self until the first MAC is finished controlling transmission on the 5 GHZ transmission channel. The first MAC then controls transmission 235 on the wireless transmission medium. After the first MAC is finished controlling transmission on the 5 GHz transmission channel, the method returns to monitoring 210 for transmission requests from the various MACs.

If a request has been received 215 for the first MAC, the method is next operative to determine if a request has been received 240 from the second MAC. If a request for the second MAC has not been received, the method returns to monitoring 210 for transmission requests. If a request for the second MAC has been received, the method is then configured to determine 245 if the first MAC is controls transmission on the 5 GHz transmission channel. If the first MAC controls transmission, the second MAC then sends 250 CTS to self until the first MAC is finished controls transmission. When it is determined that the first MAC is finished controls transmission 245, or that the first MAC is not controls transmission, the first MAC then sends 255 CTS frames to itself until the second MAC is finished controls transmission. The second MAC then controls transmission 260 on the wireless transmission medium. When the second MAC finishes controls transmission, the method is then configured to return to monitoring 210 for transmission requests from the various MACs.

Figure 3:
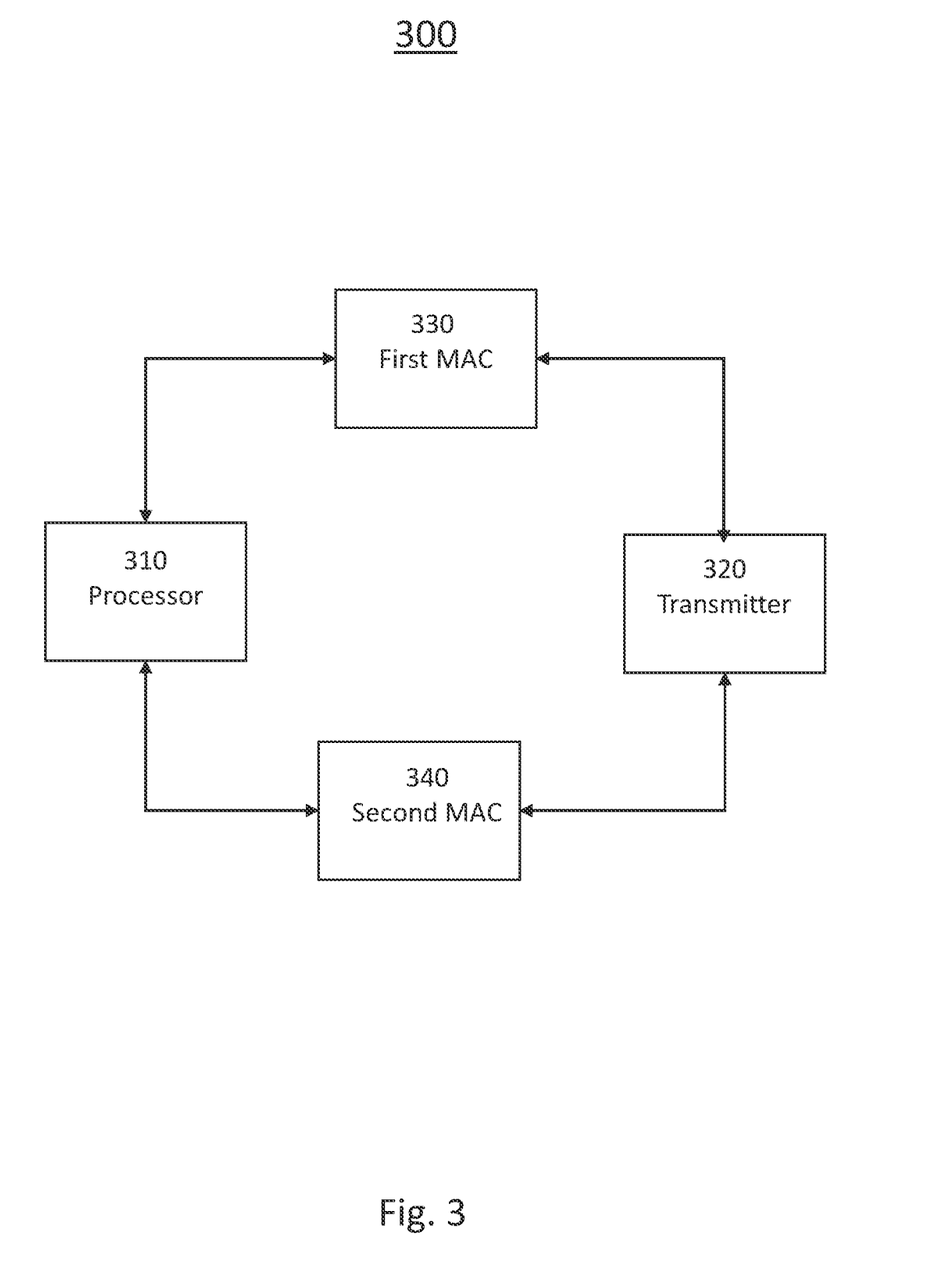
FIG. 3 shows a block diagram illustrating another system for intelligent wireless protocol optimization according to another exemplary embodiment.

Turning now to FIG. 3, a diagram illustrating an exemplary embodiment of a network device 300 for intelligent wireless protocol optimization is shown. The exemplary network device 300 may include a processor 310, a transmitter 320, a first media access controller 330, and a second media access controller 340.

In this exemplary embodiment, the processor 310 may be configured for receiving request from a first media access controller 330 to transmit a first data signal. In response, the first media access controller 330 is configured for coupling a ready to send packet to a second media access controller 340 in response to the request from the first media access controller 330 and the second media access 340 controller being currently transmitting a second data signal. In one exemplary embodiment, the first media access controller 330 and the second media access controller 340 may form a portion of a dual media access controller chip. The processor 320 may be further configured for receiving a request from the second first media access controller to transmit a third data signal and transmitting, detecting the transmission of a fourth data signal by the first media access controller and transmitting the third data signal in response to a completion of the transmission of the fourth data signal by the first media controller.

The exemplary system 300 further includes a transmitter 320 configured for transmitting the first data signal and for continuing transmission of the second data signal in response to a completion of the transmission of the first data signal. In one example, the transmitter may be a radio frequency transmitter and wherein the first data signal and the second data signal are transmitted via a wireless transmission channel. The first data signal and the second data signal may be transmitted via a five gigahertz wireless transmission channel. The first data signal may be a wireless phone projection signal or a video stream from a wireless camera. The second data signal may be a wireless hotspot connection signal. In this example, a feature associated with the first data signal may have a higher priority than a feature associated with the second data signal.

The second media access controller 340 may be configured for transmitting a clear to send packet to the second media access controller 340 in response to the transmitting of the first data signal by the first transmitter 320. The second media access controller 340 may continue to send this CTS packet to itself until the first media access controller 330 is finished controlling transmission on the wireless transmission channel. In one example, after the first media access controller 330 is finished controlling transmission on the wireless transmission channel, the second media access controller can return to controlling transmission on the wireless transmission channel. Alternatively, the second media access controller 340 may control transmission on a second wireless transmission band, such as a 2.4 GHz band, while the first media access controller 330 is controlling transmission on the same band as the first controller wireless transmission channel.

In another exemplary embodiment, the system 300 may be a dual media access controller including a transmitter 320 for transmitting a first data signal and a second data signal, a first media access controller 330 for generating a first request to transmit a first data signal, and a second media access controller 340 for receiving a request to send packet in response to the transmitter transmitting the second data signal and the first request to transmit the first data signal, the second media access controller being configured for transmitting a clear to send packet to the second media access controller in response to the transmitting of the first data signal by the transmitter 320. The transmitter 320 is a radio frequency transmitter and the first data signal and the second data signal are wireless data signals.

Figure 4:
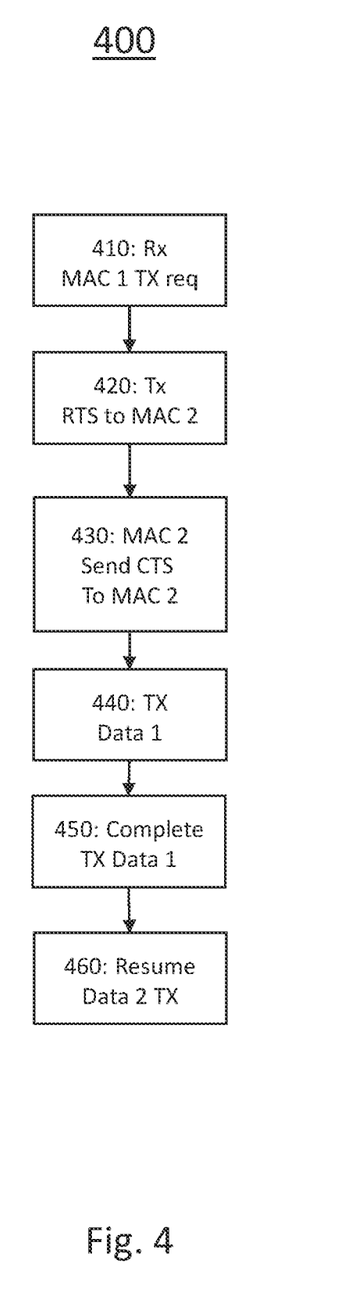
FIG. 4 shows a flow chart illustrating another method for intelligent wireless protocol optimization according to another exemplary embodiment.

Turning now to FIG. 4, a flow chart illustrating an exemplary implementation of a method 400 for intelligent wireless protocol optimization is shown. The method is first operative for receiving 410, by a processor, a request from a first media access controller to transmit a first data signal.

The method is then configured for transmitting 420, by the processor, a ready to send packet to the second media access controller in response to the second media access controller being currently transmitting a second data signal;

The method then transmits 430 a clear to send packet by the second media access controller to the second media access controller in response to the transmitting of the first data signal by the first media access controller.

The exemplary method may next transmit 440 the first data signal by the first media access controller; the first media access controller and the second media access controller form a portion of a dual media access controller chip.

The method is then configured to detect 450 the completion of transmission of the first data signal.

Finally, the method is configured for continuing 460 transmission of the second data signal in response to a completion of the transmission of the first data signal by the first media controller. In this exemplary embodiment, the first data signal and the second data signal may be transmitted via a wireless transmission channel. For example, the first data signal and the second data signal are transmitted via a five gigahertz wireless transmission channel. The first data signal may be a wireless phone projection signal requiring a dedicated data connection and the second data signal may be a wireless hotspot connection signal which does not require dedicated operation in one frequency. In this example, the feature associated with the first data signal, such as a video stream from a wireless camera, may have a higher priority than a feature associated with the second data signal.

In a related embodiment, the method may further receive, by the processor, a request from the second first media access controller to transmit a third data signal and transmitting, detecting the transmission of a fourth data signal by the first media access controller and transmitting the third data signal in response to a completion of the transmission of the fourth data signal by the first media controller.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving, by a processor, a request from a first media access controller to transmit a first data signal;
   transmitting, by the processor, a ready to send packet to the second media access controller in response to the second media access controller being currently transmitting a second data signal;
   transmitting the first data signal by the first media access controller;
   transmitting a clear to send packet by the second media access controller to the second media access controller in response to the transmitting of the first data signal by the first media access controller; and
   continuing transmission of the second data signal in response to a completion of the transmission of the first data signal by the first media access controller.

2. The method of claim 1 wherein the first media access controller and the second media access controller form a portion of a dual media access controller chip.

3. The method of claim 1 wherein the first data signal and the second data signal are transmitted via a wireless transmission channel.

4. The method of claim 1 wherein the first data signal and the second data signal are transmitted via a five gigahertz wireless transmission channel.

5. The method of claim 1 wherein the first data signal is a wireless phone projection signal.

6. The method of claim 1 wherein the second data signal is a wireless hotspot connection signal.

7. The method of claim 1 further including receiving, by the processor, a request from the second media access controller to transmit a third data signal, detecting the transmission of a fourth data signal by the first media access controller and transmitting the third data signal in response to a completion of the transmission of the fourth data signal by the first media access controller.

8. The method of claim 1 wherein a feature associated with the first data signal has a higher priority than a feature associated with the second data signal.

9. The method of claim 1 wherein the first data signal is a video stream from a wireless camera.

10. An apparatus comprising:
a processor for receiving a request from a first media access controller to transmit a first data signal and for coupling a ready to send packet to a second media access controller in response to the request from the first media access controller and the second media access controller being currently transmitting a second data signal;
a transmitter configured for transmitting the first data signal and for continuing transmission of the second data signal in response to a completion of the transmission of the first data signal; and
the second media access controller being configured for transmitting a clear to send packet to the second media access controller in response to the transmitting of the first data signal by the first transmitter.

11. The apparatus of claim 10 wherein the first media access controller and the second media access controller form a portion of a dual media access controller chip.

12. The apparatus of claim 10 wherein the transmitter is a radio frequency transmitter and wherein the first data signal and the second data signal are transmitted via a wireless transmission channel.

13. The apparatus of claim 10 wherein the first data signal and the second data signal are transmitted via a five gigahertz wireless transmission channel.

14. The apparatus of claim 10 wherein the first data signal is a wireless phone projection signal.

15. The apparatus of claim 10 wherein the first data signal is a video stream from a wireless camera.

16. The apparatus of claim 10 wherein the second data signal is a wireless hotspot connection signal.

17. The apparatus of claim 10 wherein the processor is further configured for receiving a request from the second media access controller to transmit a third data, detecting the transmission of a fourth data signal by the first media access controller and transmitting the third data signal in response to a completion of the transmission of the fourth data signal by the first media access controller.

18. The apparatus of claim 10 wherein a feature associated with the first data signal has a higher priority than a feature associated with the second data signal.

19. A dual media access controller comprising:
a transmitter for transmitting a first data signal and a second data signal;
a first media access controller for generating a first request to transmit a first data signal; and
a second media access controller for receiving a request to send packet in response to the transmitter transmitting the second data signal and the first request to transmit the first data signal, the second media access controller being configured for transmitting a clear to send packet to the second media access controller in response to the transmitting of the first data signal by the transmitter.

20. The dual media access controller of claim 19 wherein the transmitter is a radio frequency transmitter and the first data signal and the second data signal are wireless data signals.

* * * * *